United States Patent [19]
Rohrig et al.
[11] 3,924,081
[45] Dec. 2, 1975

[54] CENTRALLY CONTROLLED TELECOMMUNICATION EXCHANGE CONNECTION ARRANGEMENT

[75] Inventors: Josef Rohrig; Justus Konig; Gunther Seidel, all of Munich, Germany

[73] Assignee: Siemens Aktiengesellschaft, Berlin & Munich, Germany

[22] Filed: Jan. 2, 1974

[21] Appl. No.: 429,813

Related U.S. Application Data

[63] Continuation of Ser. No. 196,929, Nov. 9, 1971, abandoned.

[30] Foreign Application Priority Data

Nov. 12, 1970 Germany ............................ 2055745

[52] U.S. Cl. ........ 179/18 EB; 179/16 F; 179/18 ES
[51] Int. Cl.$^2$ ............................................ H04Q 3/54
[58] Field of Search ........... 179/18 ES, 18 J, 18 EB, 179/16 F; 340/172.5

[56] References Cited

UNITED STATES PATENTS 3,281,539 10/1966 Dunlap et al. .................... 179/18 J

*Primary Examiner*—Thomas W. Brown

[57] ABSTRACT

Apparatus is described for use in program controlled telecommunication exchange installations wherein individual switching elements are combined in groups and are connected with a central control over buffer stores, each group having its own buffer store. Each buffer store is connected with the individual apparatus of a group over common circuits. The number of individual apparatus per group is predetermined, and they are connected to their respective buffer stores so as to be in direct communication therewith. Each of the buffer stores is connected to the central control over individual transmission lines.

2 Claims, 5 Drawing Figures

CENTRALLY CONTROLLED TELECOMMUNICATION EXCHANGE CONNECTION ARRANGEMENT

This is a continuation of application Ser. No. 196,929, filed Nov. 9, 1971, now abandoned.

BACKGROUND OF THE INVENTION

This invention relates to the general problem of information exchange between a central apparatus and a relatively large number of individual apparatuses or switching elements.

Thus, for example in telephony technology numerous exchange installations with central control have come into use. A central control device is connected to a large number of individual apparatuses. The term "individual apparatus," as used herein, refers to the individual elements needed for completing a connection through an exchange, as for example, junctors for internal and external connections, dial receivers, registers and regulators for switching networks or portions thereof. The central control device exchanges information with the individual apparatuses and takes over from these apparatuses the largest portion of the logical information processing. Through this centralization of the logical functions of an exchange installation it is known that its total outlay in economic terms can be significantly reduced. Also, in such exchange installations very advantageous changes in the manner of functioning can be made, because appropriate circuit modifications only have to be performed at a central place, e.g., in a central program store. For such centrally controlled telephone exchange installations, besides the time multiplex principles, among other things, the principle of connecting only one single apparatus of the many individual apparatuses with a central control device at any one moment, for the time it takes to complete a self-contained function, has become known. The individual apparatuses, which must be connected with the central control device in order to set in motion any control process, are therefore, all connected thereto briefly, one after the other, i.e., never simultaneously. This principle is also called the "one-at-a-time" principle. Understandably, this connecting is controlled most appropriately from the central control device. Thus, it is suggested that the connecting means themselves, e.g., connecting relays, or gating circuits, also be attached to the central control device. Information circuits proceed from these connecting means of the central control device corresponding to the individual apparatus, between the central control device and the individual apparatuses, which are attached individually thereto. These information circuits therefore represent a radial network, whose mid-point forms the central control device. The prerequisite for the named connection at a central place lies in this radial network, which is of advantage because the connecting commands are formed here also.

On the other hand, it is also known to provide a series line leading from individual apparatus to individual apparatus to transmit the items of information to be exchanged with the central control device. This series line is, just as the central control device, provided in common for all individual apparatus, so that one can also speak of a central line. Such a series line enables one to reduce substantially the total necessary outlay for the information exchange. This is of special importance when central control device and individual apparatus are spatially separated from each other, and the number of individual apparatuses is relatively large.

As already explained, the "one-at-a-time" principle is used frequently in information exchange between individual apparatuses and a central control device. The central control device never exchanges information with several apparatuses simultaneously, but rather always only with a single apparatus, and with the separate individual apparatuses always only successively one after the other. Since, therefore, the time available for information exchange is distributed to the individual apparatuses, there results, under the previously mentioned prerequisite of a relatively large number of individual apparatuses, a time limitation for each of said apparatuses for the information exchange with the central control device. Now, in order not to have to provide correspondingly expensive transmission and reception means (equipment) for each individual apparatus, for the information exchange, because of the time limitation and the resulting necessary large transmission speeds, intermediate stores were provided already for speed adaption, which come into connection with the individual apparatuses as well as with the central control device and are adapted to both transmission speeds. To these intermediate storage and recoding devices, denoted as operating field control devices in U.S. Pat. No. 3,665,110, is attached a group of individual apparatuses. Each operating field control device is connected with them over a line which is attached thereto, and therefore, is common to the individual apparatuses of the respective group. Likewise, the central control device is connected with all operating field control devices over a line common to them. The line system between central control device and individual apparatuses therefore has two stages. In each stage the cited principle of the central line is used; namely, that the individual apparatuses of each of the groups are connected respectively over a common line with the associated operating field control device and all of the operating field control devices in turn are connected with the central control device over a line common to them.

An essential aspect for any centralization scheme is reliability. With increasing levels of centralization the necessary amount of operational reliability increases. Thus, very generally, central arrangements are often provided in duplicate, operated in parallel, and monitored through continuous comparison of their results. If central arrangements are doubled for these reasons, then it is consistent to double a central line also, as known arrangements demonstate. The explained advantage of saving expenditures on a central line is thus diminished by the expense necessary for its doubling. This effect is amplified by the information transmitters and information receivers necessary in central and individual apparatuses, in that transmitters and receivers must also be doubled in the individual apparatuses.

The principle of the central line produces, in addition thereto, special transmission problems. A central line necessarily has branches corresponding to the number of individual apparatuses (e.g., in the above case operating field control devices). It is known that such branches impair the transmission characteristics of a line severely. Each such branch represents a junction in the line. "Junction" is understood here in the sense of the concept defined in transmission line theory. At each junction it is known that there appears a reflection in the line. This results, as is known, in a corresponding reflection attenuation on the line. Further, each reflection causes backward oscillations, which limit the transmission possibilities on the line. Through a plurality of branches, whose exact number and arrangement can not be determined at the outset, the transmission relationships of a line with respect to reflections and total damping attenuation are generally worsened and these become greater with respect to the different line segments. Likewise, a central line has a line capacitance of a value limiting the transmission speed on account of its total length. The transmission impairment of a line through branches and line capacitance sets strict bounds for its efficiency. A satisfying compensation for these influences fails because of the fact of the branches, in particular because their position, interval (from each other) and number, i.e., the entire course of the branched central line, cannot as a rule be predetermined. One can, therefore, ascertain that the otherwise very advantageous savings for a central line are contrasted with transmission disadvantages. With an increasing number of individual apparatuses (e.g., operating field control devices in the above example from the patent literature) the maximum transmission speed of information on the central line drops, as does its efficiency. The number of individual apparatuses is related, therefore, to the effective requirements inversely as the efficiency of the central line.

SUMMARY OF THE INVENTION

The invention provides an arrangement for centrally controlled telecommunication installations, in particular telephone exchange installations, in which individual apparatuses are combined into groups and are connected with a central control apparatus over buffer stores, each group of individual apparatus having its own buffer store. The task of the invention is to produce an optimal solution, especially for the use of electronic circuit elements, with respect to the aforementioned expense and transmissiontechnical aspects. This is accomplished in accordance with the invention through an arrangement having the following characteristics:

a. Each buffer store is connected with the individual apparatuses of a group over circuits common to the apparatuses in a group, but to which the individual apparatuses can be connected singly.

b. The individual apparatuses of a group are limited with respect to their number and are united structurally with their buffer store such that the circuit elements of the individual apparatuses and of the buffer store are in state of direct singal exchange, and line influences are removed.

c. The buffer stores are connected with the central control apparatus over individual lines.

d. Transmitters or receivers are attached to the individual lines singly in the buffer stores as well as in the central apparatus, the transmitters and receivers are adapted transmission-technically to the individual lines.

Through the invention, the advantages of a line adapted in the sense of the transmission line theory for information transmission between buffer stores and central apparatus are put to use. In a comparison of expenditures given in the following, we start first with three types of influencing factors, that is:

the required information transmission output per buffer store;

the required information transmission output of a central line i.e., a line to the central control; and the actual information transmission output capability of a central line.

The required information transmission output per buffer store would be constant. The required information output of the central line rises proportionally with the increase in buffer stores. The actual information transmission output of the central line drops, in comparison thereto, with an increase in buffer stores because of the increase of junction points in the central line which accompany it, and because of the worsening of its transmission characteristics. The backward traveling tendency of the necessary information transmission output, i.e., of the information transmission output requirement and the actual information transmission output capability of the central line, dependent on the increase in buffer stores, should be noted.

For the comparison of expenditures one must start with the fact that with use of a single individual line per each buffer store, the line's information transmission output capability and the store's information transmission output requirement are related to each other in a fixed manner. An increase in buffer stores with individual lines has no effect hereupon. But, it is otherwise with use of a central line. In the theoretical case of a single buffer store the relationships are still indentical. With an increase in buffer stores the information transmission output capability of the central line drops, as explained, and the information transmission output requirement rises. With a specific number of buffer stores the information transmission output requirement has reached the peak of the information transmission output capability of the central line. With further increase in buffer stores the information transmission output requirement of the central line must be made to approximate the information output requirement through an increase in its circuits. Thereby, the number of transmitters and receivers now increases also. With an increase of only from one to two circuits of the central line, the total expenditures for transmitters and receivers, which in this case corresponds to the sum from the number of buffer stores and the one central control device, multiplied by the number of the circuits, exceeds the expenditures for transmitters and receivers in the other case and to be sure when using individual lines per buffer store, which corresponds to only twice the number of buffer stores. With a further increase in circuits of the central line, the relationship of expenditures shifts further in favor of using individual lines per buffer store. This comparison of expenditures in favor of the use of individual lines per buffer store is all the more significant, the higher the required information transmission output per buffer store in relationship to the information transmission output capability of the individual line.

The savings of circuits, transmitters and receivers is even greater, whenone can forgo, by reason of the individual line per buffer store between buffer store and central apparatus, duplication of the line. In addition, along with these considerations of expenditures, the fact that by reason of the individual line between buffer store and central apparatus one can forgo the addressing, i.e., connecting circuits necessary with a central line, is also of importance.

BRIEF DESCRIPTION OF THE DRAWINGS

The principles of the invention will be best understood by reference to a description of a preferred embodiment thereof given hereinbelow in conjunction with the drawings in which.

DETAILED DESCRIPTION OF THE DRAWINGS

Figure 1A:
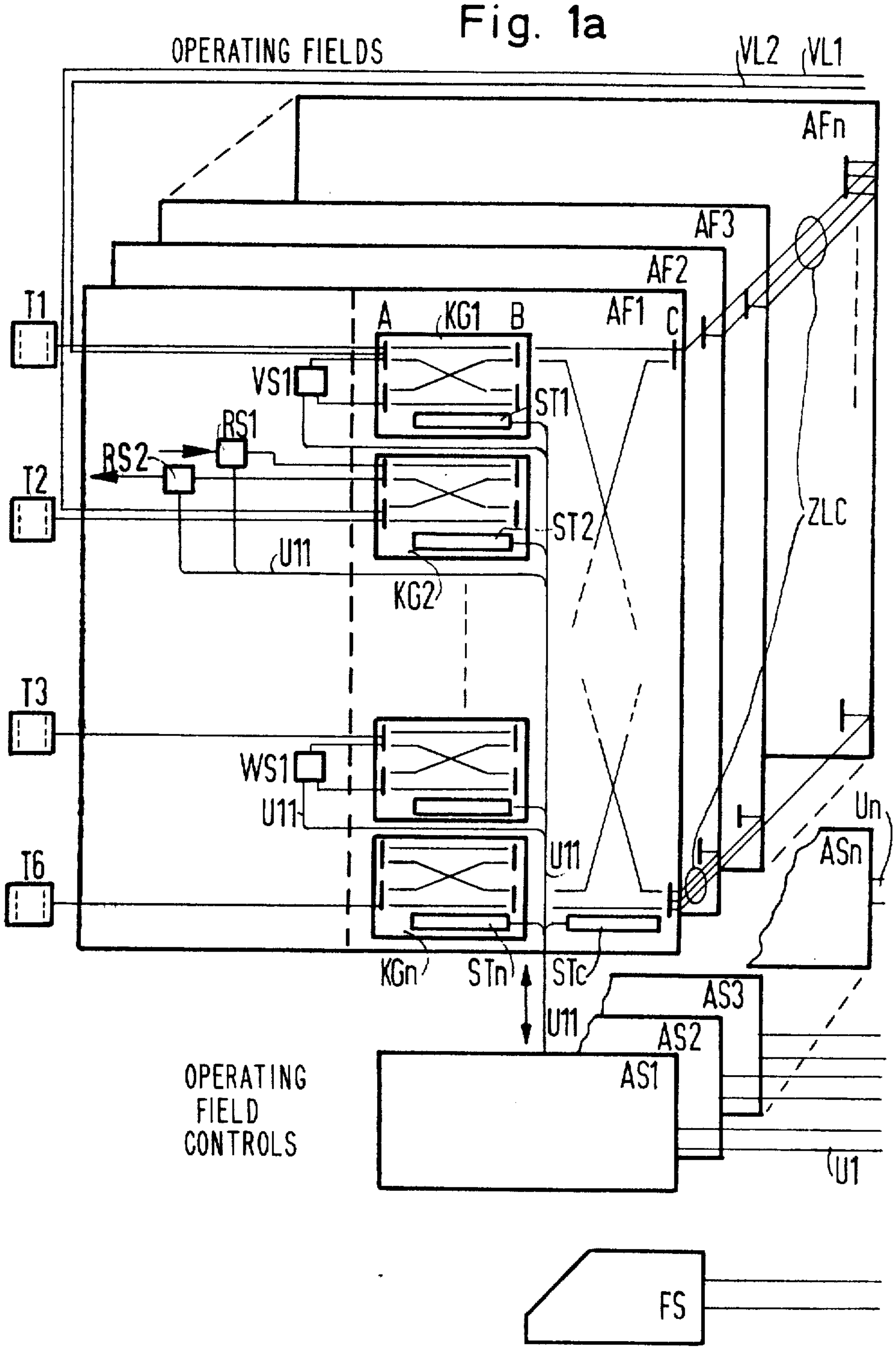
FIG. 1, constituted by FIGS. 1a and 1b, is a schematic diagram of a telecommunication exchange installation, of otherwise known construction, to which the invention is applied.
Figure 1B:
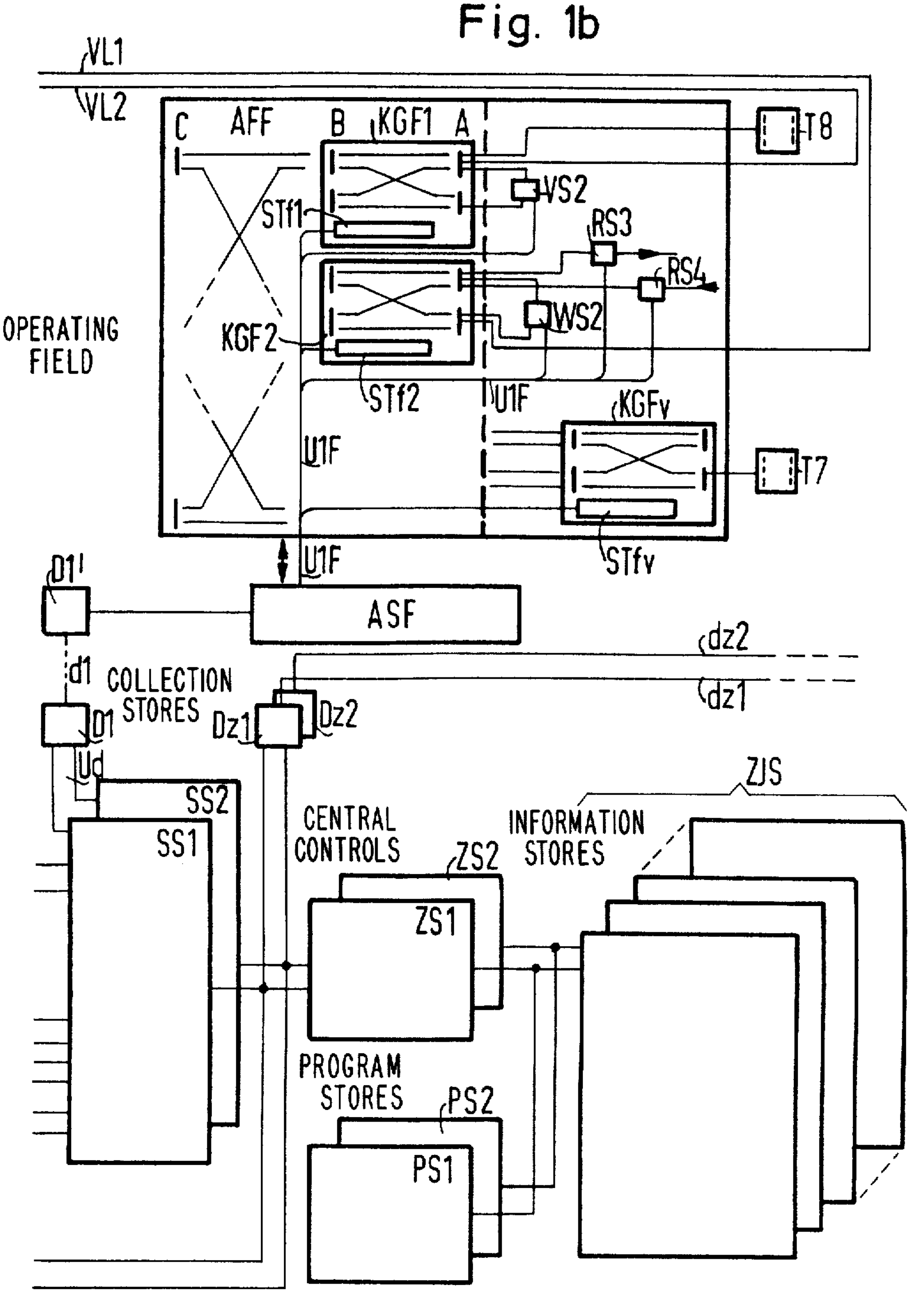

Several groups AF1 to AFn, AFF, etc., of individual apparatuses are indicated in FIG. 1. These groups are denoted as operating fields in the following description. The operating fields of activity AF1 to AFn are components of a larger exchange installation. To each these is attached, individually, an intermediate storage and recording device (buffer store) AS1 to ASn, denoted in the following as operating field control devices. The operating field control devices AS1 to ASn of the exchange installation are connected over two individual lines U1 to Un and two common information collection transmission stores, which serve to realize the principle of information collection transmission and are denoted in the following as "collection stores," individually to two central control devices ZS1 and ZS2. The parallel arrangement of two collection stores and central control devices each next to two individual lines U1 to Un serves in a known manner to raise the operational reliability of the total exchange installation with respect to the possibility of a malfunction or operational interruption of a central control device, as well as also to monitor errors through comparison of two pieces of information produced independently of each other by two different central control devices. Since this is not essential for the understanding of the invention, in the following we consider predominantly only a single central control device ZS1, a single collection store SS1 and, respectively, a single individual line, e.g., U1, U2, etc. Data transmission apparatuses, e.g., D1 and further ones, which are not represented, are connected over an individual line, e.g., Ud, to the collection store SS1. These data transmission apparatuses, of known construction, hereafter denoted "data apparatuses," form, respectively, with a second, individually attached data apparatus, e.g., D1', and a data line, e.g., d1, data channels, which single enable distant operating fields, e.g., AFF, to exchange information with the central control device ZS1. It is also possible to provide a common data channel for operating fields located at one and the same distant place.

The operating fields comprise, respectively, a large number of individual apparatuses of different types. These can include, among others, the coupling groups, e.g., KG1 to KGn, KGf1, KGf2, etc., composed of separate coordinate multiple couplings, in the coupling stages A and B of the three-stage switching network. To each coupling group, e.g., KG1, is attached its own setting device, e.g., ST1, which executes setting commands received from the field of activity control device. One coupling group with attached setting device forms, respectively, an individual apparatus. Individual apparatuses are further the entirety of the multiple couplings of the coupling stage C with its setting device STc. This arrangement is described in greater detail in British Pat. No. 1,058,893. It is also possible to combine these multiple coupling in an operating field in several individual apparatuses with their own setting devices.

Individual apparatuses can be, as well, junctors, e.g., VS1, for connections to be through-switched within the exchange installation formed from the operating fields AF1 to AFn, further line sets, e.g., RS1, RS2 and others, which are attached separately to connection lines (local or long distance lines) to exchange installations at other locations for incoming and/or outgoing connections. These individual apparatuses also include dial receivers, e.g., WS1 and others, with which subscribers are connected temporarily for the duration of reception of dial information given by them. The various individual apparatus are of known construction and need not be described further herein.

In additon, individual subscriber connection circuits, not shown, can be combined singly or in groups as individual apparatuses. Further, we refer to the possibility of combining the named individual apparatuses into operating fields with an individual operating field control device. Thus, it is conceivable, for example, to form groups of individual apparatuses, which comprise only apparatuses of a single type, and then to attach an individual field of activity to each of these groups.

All these individual apparatuses of an operating field, e.g., AF1, are connected with the respective operating field control device, e.g, AS1, over circuits common to them, e.g., U11. Each individual apparatus contains connection means to connect to those circuits which can be controlled by the operating field control device. Hereto, insofar as the necessity of a connection in the individual apparatus exists, in a manner described below with further details, a connection stimulus is emitted from this individual apparatus to the operating field control device. which is identified here and leads to the emission of a connection command to the applicable individual apparatus. Each operating field control device, e.g., AS1, is therefore connected with the individual apparatuses of its group, i.e., of its operating field over circuits common to them, e.g., U11, to which the individual apparatuses can be connected separately. The individual apparatuses of a field of activity, e.g., AF1, (group of individual apparatuses) are restricted in their number and united with their operating field control device (buffer store) structurally (cf. FIG. 4) such that the circuit elements of the individual apparatuses and of the operating field control device are in the relationship of direct signal exchange, when line influences are switched off.

The multiple couplings of several operating fields at one location form a single common switching network, which simply for reasons which do not relate originally to the grouping of the switching network (e.g., reliability, expansion possibilites, and questions of traffic load) is divided into several regions of competence of several field of activity control devices. The switching network formed from the multiple couplings in the coupling stages A, B and C of the field of activity AF1 to AF11 is constructed from multiple couplings in three coupling stages connected with each other over intermediate lines; to the inputs of the first coupling stage (FIG. 1*a*;A) are connected subscriber lines, connection lines, and all inputs and outputs of switching elements necessary to establish and monitor a connection, e.g., junctors VS1, VS2, dial receivers WS1, WS2, and such, all in the same manner; outputs of the multiple couplings of the first to the next-to-last coupling stage, which are connected separately to the inputs of the multiple couplings of the respective succeeding coupling stage can be switched together pair-wise in this respective succeeding coupling stage. Such a switching network has already been shown and described by the West German Pat. No. DBP 1,235,379, and the above referenced British Patent. The particular characteristic of a special formation of such a switching network consists in the fact that from a switching network input the outputs of each of the multiple couplings can be reached over at most a single connection path. Thereby, in a path search directed from a switching network, through selection of one of these outputs the path to be switched through over the switching network for the desired connection is already uniquely established. The switching network is, viewed from its inputs to the outputs of its couplers, constructed in a fanwise fashion. However, in spite of that, two switching network inputs can be connected alternatively over different paths, because several common multiple coupling outputs, i.e., any two multiple coupling outputs belonging to the last coupling stage in different fields of activity and connected permanently over an intermediate line (ZLC) respectively, are accessible from the two switching network inputs.

The operating fields, e.g., AF1, have therefore three coupling stages, whose multiple couplings are connected over intermediate lines in the manner such that to a multiple coupling output in the first to next-to-last coupling stage A and B one multiple coupling input in the second to the last coupling stage B and C, respectively, is permanently attached, singly. The outputs of the multiple couplings of the coupling stage C are in part not wired in the operating fields AF1 to AFn (in the operating field AFF not at all). In the operating fields AF1 to AFn the essential portion from these outputs is separately switched together pairwise over intermediate lines ZLC leading from operating field to operating field.

A program store PS1 and PS2 are attached respectively to the two adjoining central control devices ZS1 and ZS2. The central control device obtains from the program store, according to which program a piece of information emitted from a field of activity control device, received over the attached collection store SS1 in the central control device, is to be processed. A multipartite information store ZJS is attached to the two central control devices, which is common to them, whose entire storage capacity therefore is available to both central control devices as needed. The central control device and associated program and information stores may be of known construction. An example of such a device which may be used will be found in the Bell System Technical Journal, November, 1958, pp. 1342 – 1382 and September, 1964, pp. 2055 – 2096.

Figure 2:
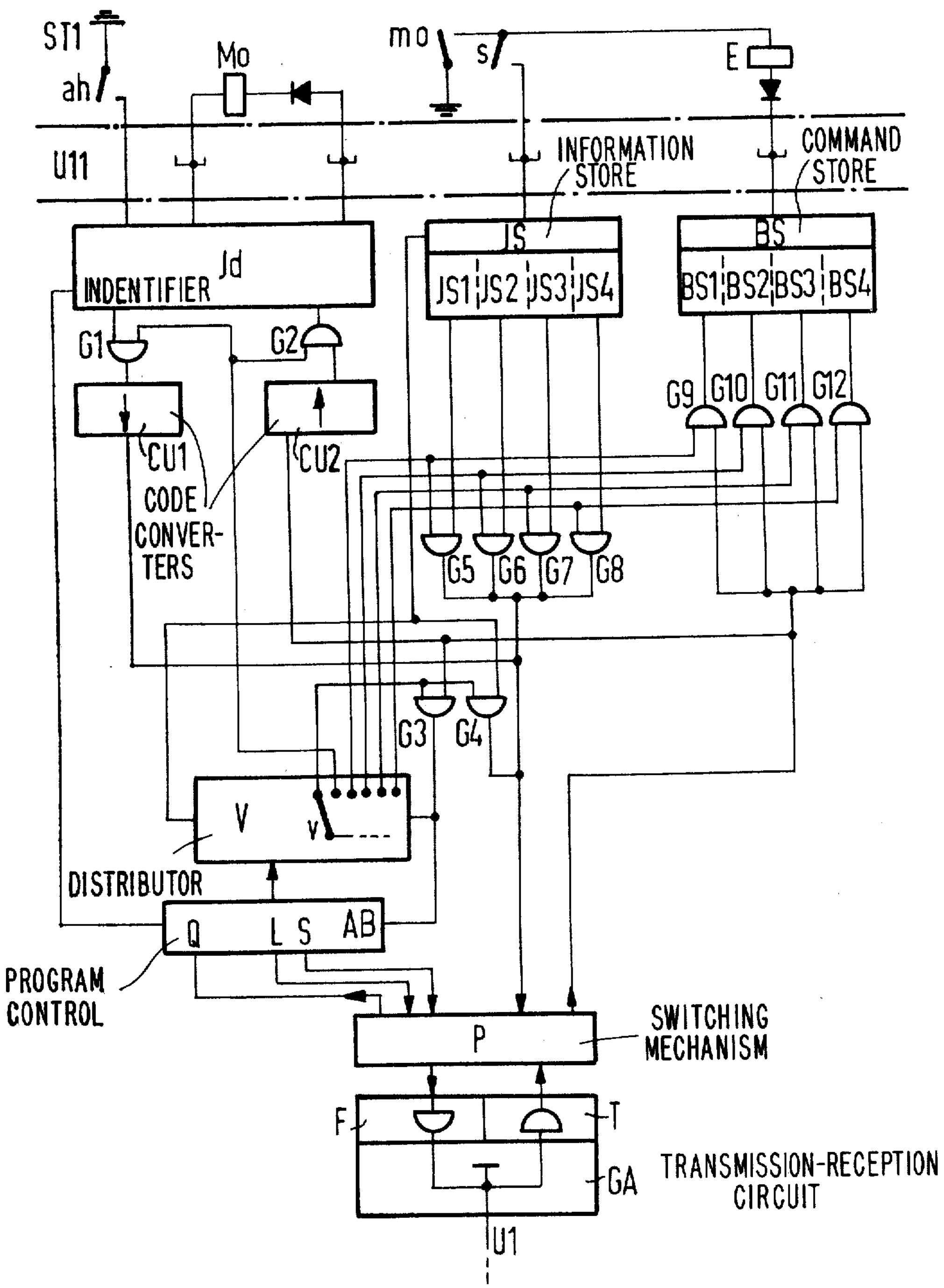
FIG. 2 is a more detailed schematic diagram of an operating field control device, which is a part of the FIG. 1 embodiment.

FIG. 2 shows further details of an operating field control device shown in FIG. 1. The operating field control devices are described herein only with sufficient detail to permit an understanding of the principles of the invention. A complete description of the construction of such devices is to be found in commonly assigned U.S. application Ser. No. 112,224, filed Feb. 3, 1971, as well as U.S. Pat. No. 3,775,565. The operating field control device is connected over circuits common to its attachd individual apparatuses, e.g., U11, with the individual apparatuses, e.g., the setting device ST1 of coupling group KG1, and on the other hand over an individual line U1 with the collection store SS1 shown in FIG. 1 and attached to the central control device ZS1. The operating field control device shown in FIG. 2 can be demanded by the individual elements, e.g., by the setting device ST1. With aid of an identifier Jd, the operating field control device is in the position to select one of several connection stimuli, available simultaneously, which are switched on over requirement contacts, e.g., ah, and to emit a corresponding connection command to the connection relay corresponding to the applicable connection stimulus, e.g., Mo. The demand circuits are directed singly from each individual apparatus to the operating field control device. The connection relays, e.g., Mo, of the individual apparatuses lie in the switching matrix which extends over all individual apparatuses.

With the help of contacts mo of the applicable connection relay Mo, contacts s as well as windings E are switched on from relays of the setting device ST1. At this point, we refer especially to the fact that the common circuits U11 connected with the contacts *s* and windings E are multi-cable. Likewise, relay contacts s and relay windings E of the setting device ST1 are provided to several cables, in contrast to the simplified representation. For transmission of information to and from the operating field control device, its circuit elements, as already indicated, and those of the attached individual apparatuses are in a relationship for direct signal exchange, when line influences are avoided.

Figure 4:
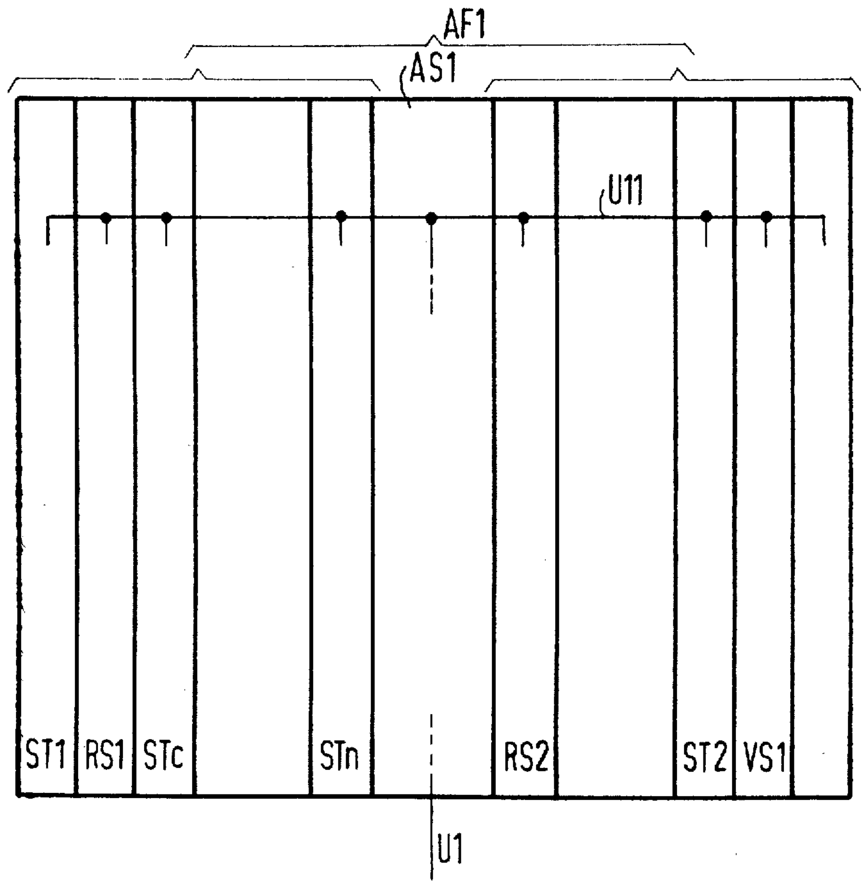

The aforementioned arrangement limits the number of individual apparatuses in a group, as FIG. 4 shows, and are united structurally in a suitable manner with their operating field control device. The operating field control device, e.g., AS1, and the attached individual apparatuses are built in plate construction manner. FIG. 4 shows the front sides. Through layering of the flat sub-assemblies forming the individual apparatuses on both sides of the operating field control device, which is also constructed as a flat sub-assembly, there results an optimal space arrangement.

The information to be transmitted over the named common circuits, e.g., U11, is in the form of several simultaneous signals. Since these common circuits, e.g., U11 do not extend over large distances, and since for this reason no line influences have an effect on the direct signal exchange between the circuit elements of the operating field control device (JS,BS) and those of the attached individual apparatuses (*s*,E), and since, further, relatively inexpensive circuit means can be inserted for signal exchange, because they satisfy fully the speed requirements for information transmission over these circuits, when the parallel delivery is used, the larger number of wires, which serve to form these common circuits, and of switching means for the connection, e.g., Mo, represent no unfavorably large circuit expense for the delivery of information. The switching means shown are in the present case electromagnetic relays, i.e., contacts thereof. It is, however, in certain conditions of more advantage to use other switching means, e.g., electronic.

Figure 3:
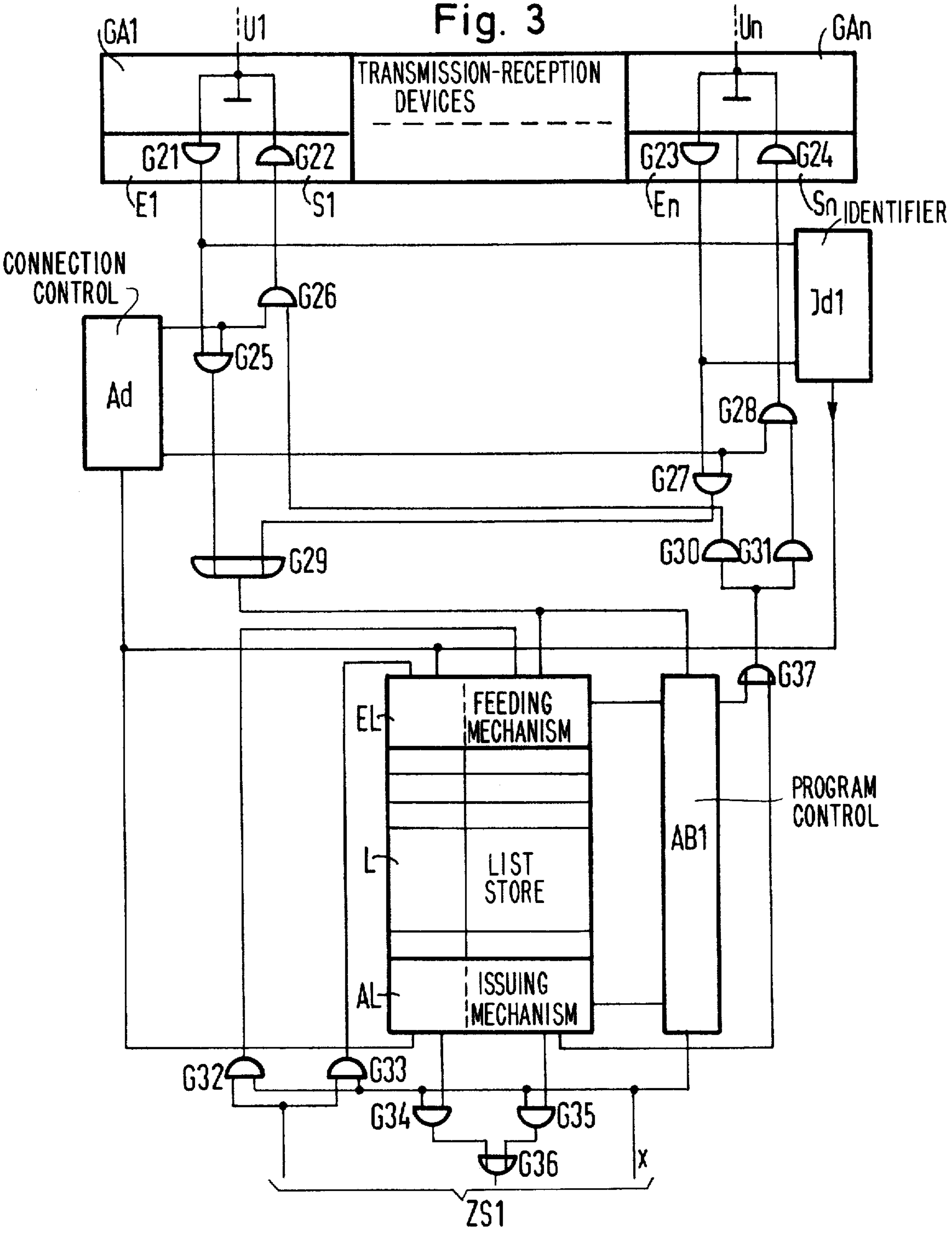
FIG. 3 is a more detailed schematic diagram of the collection stores which are a part of the FIG. 1 embodiment and FIG. 4 is a front elevation of a preferred arrangement of individual apparatus forming a group.

The cable running between the collection stores SS1 and the operating field control devices, e.g., AS1, is different from the one between the operating field control devices and the individual apparatuses. As was already described, in the latter case common circuits of the reciprocal information delivery serve one field of activity and the individual apparatuses belonging thereto at a time through direct signal exchange. For transmission of information between the collection store and the operating field control devices, in contrast, individually attached lines U1 to Un serve them, hereafter denoted respectively as "individual line". Each of these lines, e.g., U1, is equipped at both ends with a transmission and reception circuit, e.g., T/F/GA and E1, S1, GA1. Each of these lines is, as FIGS. 2 and 3 show, made as double wires. A hybrid circuit serves as transmission - and reception circuit, e.g., GA, GA1, with a transmission portion, e.g., F, S1, and a reception portion, e.g., T, E1. Each hybrid circuit is equipped for transmission adaptation to the line in a known manner with an appropriate equivalent network. Thereby, the advantages of a line adapted in the sense of the line transmission theory for the transmission of information between buffer stores and central control device is rendered usable and the actual information transmission output capability of the line is significantly increased. The advantages herefrom were explained extensively in the introduction.

In preparation for a description of the manner of functioning of the operating field control device, a few concept definitions are now given. As can be gathered from the foregoing explanations, pieces of information are transmitted from the individual apparatuses to the central control device, as well as also from the central control device to the individual apparatuses. In each case, besides the collection store SS1, the operating field control devices serve thereby as intermediate elements. The information transmission from an individual apparatus to the collection store SS1 is hereafter always denoted as "Read." The opposite transmission of information from the collection store to an individual apparatus is always denoted as "Print." Corresponding thereto, the signals "Read" and "Print" are formed in the operating field control device. The items of information to be transmitted from the central control device to individual apparatuses are hereafter denoted only as commands.

The "Read" signal is always formed in the operating field control device, when on the basis of a demand from an individual apparatus, e.g., from the setting device ST1 over the demand contact ah, it was connected with the field of activity control device (relay Mo) and has transferred an item of information to its information store JS, which is now to be transmitted to the collection store SS1. Further, the formation of the "Read" signal presumes that all switching processes of preceding functions are ended. If there exists no such requirement at the individual apparatus's end, then the "Print" signal is formed in the operating field control device, which expresses the readiness of the operating field control device to accept items of information which are in the collection store SS1, if the need arises, and are to be transmitted to this operating field control device.

In addition thereto, the case can also arise that neither a demand from an individual apparatus exists nor that the operating field control device is prepared to accept information. This operational state exists when an operating field of activity control device is not yet finished with the processing of a piece of information. In this case, the operating field control device is not ready for any information exchange with the collection store, and a "blockage" signal is formed in the operating field control device.

The described signals "Read," "Print" and "Blockage" are formed in a program control mechanism AB of the operating field control device. The "Read" signal is emitted over the output L of the program control AB, and the "Print" signal is emitted over the output S from the discharge control. The structural details of the program control and the latter outputs are to be found in commonly assigned U.S. application Ser. No. 112,224, filed Feb. 3, 1971. The "Blockage" signal is caused by the fact that the two signals "Read" and "Print" are emitted simultaneously. However, it is also possible to cause the "Blockage" signal through the absence of the two signals "Read" and "Print" or to provide a special signal circuit herefor. These signals, formed in the operating field control device, are transferred to a switching mechanism P. If the "Read" signal is present, in the operating field control device, then the switching mechanism P emits a demand signal over the line U1 to the collection store. In contrast, if either the "Print" or "Blockage" signal is present in the operating field control device, then the switching mechanism P emits corresponding switching signals over the line U1 to the collection store, only insofar as it has previously emitted an appropriate requirement characteristic to the operating field control device.

The collection store SS1 (FIG. 1b) is illustrated in greater detail in FIG. 3. The lines U1 to Un attached to the operating field control devices individually each have a transmission and reception circuit per operating field in the collection store SS1 (FIG. 3). In addition, the collection store has one connecting mechanism per operating field, which in the explanatory example is comprised of two coincidence gates, e.g., G25, and G26, for the operating field control device.

Further, reference is made to the identifier Jdl, of known construction, in the collection store, which serves to receive the demand information emitted by the operating field control devices and to select a single demanding operating field control device and which emits the respective address of the applicable operating field control device in coded form after every identification process. Further, a connection control Ad, of known construction, in the collection store, which emits an appropriate connection signal to the coincidence gates, e.g., G25 and G26, which correspond to the respective applicable operating field control device and serve to connect it on the basis of a coded address of an operating field control device which is transmitted to the connection control device. The operating field control device of FIG. 2 and the collection store of FIG. 3 are described in common in the following.

If the "Read" signal is present in an operating field control device, then, as already described, a corresponding demand characteristic is transmitted over the attached individual line U1 to the collection store. It arrives at the collection store's identifier Jdl, which on the basis of the demand executes an identification procedure and emits the address corresponding to the operating field control device in coded form. This address is offered to a list store L over its feeding mechanism EL as well as transmitted to the connection control Ad, which for its part with the help of the applicable gating circuits, e.g., G25 and G26, effects the connection of the individual line U1 corresponding to the applicable operating field control device. Thereafter, the program control AB1 of the collection store delivers a proceed-to-send signal over the gates G37, G30 and G26, to the connected operating field control device, which is transformed in the switching mechanism P (FIG. 2) and is transmitted as an acknowledgment signal to input Q of the discharge control AB of the operating field control device.

The information is transmitted from the field of activity control device to the collection store in several successive segments. Each partial information item is fed in and confirmed, sorted by special signals. This and the segment-wise information transmission are explained in more detail in the following.

Each item of information is divided into several partial items of information. All pieces of information are binarily coded. All switching signals of an item of information to be transmitted to the central control device are transferred from the respective individual apparatus simultaneously to the operating field control device over the circuits, e.g., U11, which are common to the individual apparatus of an operating field and connect them with their operating field control device. According to the range of this item of information, it is divided in the operating field control device into a maximum of four partial items of information. In the information store JS, for each of four partial items of information, one part of this store is provided: JS1, JS2, JS3 and JS4. Likewise, in a command store BS, for each of four partial items of information one part of the store BS is provided: BS1, BS2, BS3 and BS4. The differential designation of information store JS and command store BS signifies, that in one case the central control device deals with "readable" information and in the other case with "printable" commands. These concepts have already been defined.

Each item of information consisting of several partial items of information and each command consisting of several partial commands is completed for transmission on the transmission line U1 through an indication of length and an address, which designates the respective individual apparatus.

The indication of length is obtained in the following manner. The partial stores JS1 to JS4 forming the information store JS serve to receive a partial item of information each. The range of an item of information is determined by the number of partial items of information. This number is the indication of length. It is fixed in the common portion of the information store JS. This is easily possible in that the number of the partial stores used in storing an item of information is determined in a known way. The indication of length is transmitted as a code signal from the common portion of the information store JS to the distributor V, among others, and stored there.

Before a transmission of information or command over the common circuits U11, the indication of length is transmitted first. It states the quantitative extent the information or command transmitted thereafter has. If its total content is expressed, instead of four partial items of information or partial commands, in less, then the information or command transmission is limited to correspondingly fewer partial items of information or partial commands. Through the preceeding indication of length are respective receiver knows, and therefore the respective operating field control device or the collection store knows, when the respective information or command transmission will be through.

In addition, the previously mentioned indication of address preceeds one of each such transmissions. Hence, it is always given beforehand, from which individual apparatus an item of information comes or for which individual apparatus a command is intended.

It has already been explained that each item of information is divided into several partial items of information. The greatest range of an item of information is determined by four partial items of information. The indication of address preceeding directly the partial items of information on the transmission line U1 of the second type, can, in addition, receive the range of one or two partial items of information. The indication of length preceeding the indication of address receives in the present example the maximum range of a partial item of information.

The indication of length, the indication of address, and the maximum four partial items of information or commands are stored intermediately in equally large groups of binary code elements in the operating field control device and recoded and transmitted to it. A specific number of bits, e.g., 8, form a group of binary code elements. Such a group is designated with "Byte" as opposed to "bit." The indication of length comprises, therefore, one Byte and the item of information or command comprise, respectively, a maximum of four Bytes. The first Byte, containing the indication of length, the second and the third Byte, containing the indication of address, and in the present example, a maximum of four, further Bytes, containing an item of information or command, together constitute a "word."

The transmission of a word over the individual line U1 is controlled with the aid of auxiliary signals. These auxiliary signals are "Read" (L), "Print" (S), "Blockage" (L+S), as previously described, and "Acknowledgment" (Q). To transmit such a word, the individual Bytes stored in the information store JS are coupled to an input of the gates G4, G5, G6, G7 and G8. The gates G4 to G8 express symbolically here that the respective named item of information placed at one of its inputs can only then be forwarded, when a corresponding signal for transmission is applied over the other input of the gate. This signal is connected by a distributor V with the help of its switching arm v, one after the other, to the various gates G1 to G12, so that the separate Bytes are transmitted successively; and namely, first the indication of length, then the address of the applicable individual apparatus and then the item of information or the command. The represented gating circuits G4 to G8 are to be understood as gate circuits for code signals comprising one Byte, whose code elements (bits) are transmitted singly one after the other in a manner not shown in detail, but well known.

The previously mentioned distributor V is controlled by the program control AB. Since the operating field control device was required by one of the individual apparatuses, as soon as the item of information and the indication of length are in the information store JS and the address is ready for transmission in the identifier Jd, and insofar as the indication of length is transmitted to the distributor V, appropriate signals are transmitted from the distributor V and from the identifier Jd to the program control AB in a known manner, which cause it to emit the "Read" signal to the switching mechanism P. As described, switching device P emits a demand signal to the collection store (FIG. 3).

The collection store undertakes, as also previously described, an identification and switching of the applicable operating field control device. Thereupon, the program control AB1 of the collection store sends, over the gates G37, G30, G26 and the line U, a proceed-to-send signal to the operating field control device. The latter signal is received by the switching mechanism and is forwarded as an acknowledgment signal to the program control AB of the operating field control device and arrives there over its input Q. The program control AB undertakes then, with the help of the distributor V, the successive transmission of the indication of length, the address of the applicable individual apparatus, and the item of information consisting of a maximum of four partial items of information.

Simultaneously with these processes of connection, the collection store has prepared for the impending pick-up of information. The address emitted by the identifier Jd1 in binary coded form was controlled by the program control AB1, entered in the left-hand part of a first free storage row over the feed-in mechanism EL of the list store L. This address deals with the address of the applicable operating field control device, which should not be interchanged with the address of the respective individual apparatus.

If the collection store now receives the word consisting of indication of length, address of the individual apparatus and item of information, then it reaches the applicable, correspondingly prepared storage cell of the list store L over the gate circuits G25 and G29. The process of transmission of a word is described in greater detail in the following.

The collection store receives then first the indication of length transmitted by the operating field control device over the line U1. As soon as it has received the indication of length, it acknowledges the receipt; an acknowledgment signal arrives in the program control AB over its input Q. Thereupon, the program control AB delivers a switching impulse to the distributor V. It switches its switching arm v one step further. Thereby, the gate G4 is blocked for passage of the indication of length and the gate G1 is opened for the passage of the address from the identifier Jd to the code converter CU1. In the meantime, the collection store is also prepared for the reception of the address of the individual apparatus, in a known manner. This address is now transmitted from the operating field control device to the collection store and entered in the previously mentioned storage line. The collection store again acknowledges the receipt, whereby the program control AB of the operating control device receives anew an acknowledgement signal over its input Q.

In the same manner, after the address of the individual apparatus, the partial items of information are transmitted in the form of further Bytes from the operating field control device to the collection store. The indication of length was already stored in the distributor V. Thus, the selected end of the information transmission can be determined in the operating field control device. Since the indication of length was transmitted to the collection store, the same applies also for the collection store. After reception of the last partial item of information of a word, the collection store returns for the last time an acknowledgment to the program control AB of the operating field control device. Since, through the initial transmission of the indication of length, the quantitative extent of the information to be transmitted was stored in the operating field control device, as well as in the central control device, it is possible in a simple manner to monitor the end of the information transmission.

After the collection store has received the information along with indication of length and address of the applicable individual apparatus and together with the address of the applicable operating field control device has stored it in a row of its list store L, it switches itself off from the individual line U11 and therewith from the operating field control device AS1. It is ready to receive further items of information. It connects itself singly, in succession, to the various operating field control devices, in the manner described already, and receives successively one after the other from different individual apparatuses over the different operating field control devices items of information with indication of length and address of the respective individual apparatus and stores them in the rows of the list store singly together with the respective address of the applicable field of activity control device, one after the other.

Either when the list store L of the collection store is full or in certain fixed intervals of time, the central control device ZS1 connects itself to the collection store SS1. Herefor, it emits an appropriate demand and connecting signal over the line $x$ (FIG. 3) to the collection store. This signal arrives at the gating circuits G34 and G35, as well as at the program control AB1. Now, in a manner not shown in detail, the collection store SS1 transmits, with the help of its program control AB1 and its issuing mechanism AL, in one stroke the whole contents of its list store to the central control device, i.e., respectively, the address of the applicable operating field control device, the indication of length, the address of the respective individual apparatus and the information. In this manner, the contents of the list store L is "read" line for line successively to the central control device. Through this principle of information collection transmission the information exchange is significantly accelerated for the central control device and thereby, its output capability is significantly increased in that the items of information common to several are received by the central control device.

In the same manner, commands which are in common with the addresses of the operating field control device and are common to several, are transmitted collectively to the collection store from the central control device. Hereto, the central control device emits an appropriate connection and preparation signal over the line $x$ to the collection store, which reaches the gating circuits G32 and G33, as well as the program control AB1. After an appropriate acknowledgment signal from the program control AB1 of the collection store to the central control device, it collectively transmits a series of commands, together with addresses of operating field control devices and in common with others, to the collection store, which here are entered by rows over the feeding mechanism EL of the list store L into its rows, in association of the operating field control device addresses to the applicable commands. After ending this process of information collection transmission from the central control device to the collection store, it undertakes the forwarding of the items of information to the various operating field control devices. Corresponding to the operating field control device addresses received with the addresses, the collection store undertakes successive corresponding connections to the various operating field control devices and transmits the respective command from the respective row of the list store to the applicable operating field control device. Such a procedure is explained in greater detail in the following.

Commands are transmitted from the collection store to operating field control devices in a manner similar to items of information. An operating field control device is ready to receive a command from the collection store, when there is no requirement from an individual apparatus present, and the operating field control device is at rest. Hereto, the program control AB learns from the distributor V, whether possibly directly preceeding processes are ended, further whether a new demand from the individual apparatus is present. If this is not the case, then it forms the "Print" signal, which it emits to the switching mechanism P.

The switching mechanism P in FIG. 2 recognizes by the "Print" signal that the applicable operating field control device is ready to receive the command. As soon as the collection store has undertaken a connection over the applicable gating circuits, e.g., G25 and G26, to the applicable operating field control device in preparation for a transmission of command from a specific row of its list store corresponding to the operating field control device address stored in this row, which it transmits with the help of its program control AB1 over the output mechanism AL to the connection control Ad, it transmits a preparation characteristic from its discharge control AB to the field of activity control device. This preparation signal is picked up by the switching mechanism P and taken into the program control AB over the input Q as an acknowledgment signal for the "Print" signal. The switching mechanism P returns a proceed-to-send signal into the collection store, which indicates to it that it should start with the transmission of the command.

The program control AB effects, over the distributor V, the opening of gate G3, for the first Byte to be expected from the collection store. This first Byte contains the indication of length, which is picked up by the distributor V and stored. It knows thereby, after how many advances of its switching arm *v* the command transmission will be ended.

In a similar manner to the transmission of information from an operating field control device to the collection store, but in the opposite direction, the bits containing the command to be transmitted are picked up over the gates G9 to G12 and received in the partial stores BS1, BS2, BS3 and BS4 of the command store BS and stored intermediately. The two bits containing the address of the respective individual apparatus and preceeding the command were picked up over the code converter CU2 and the gate G2 in the identifier JD. These two bits are converted by the code converter CU2. The identifier JD forms herefrom a connection command, through which the applicable connection relay, e.g., Mo, of that individual apparatus, e.g., SP1, which is designated by the address, is excited.

After complete transmission of the command from the collection store to the operating field control device, it disconnects itself therefrom again. The collection store now turns to the next command in the next row of its list store and transmits it corresponding to the stored operating field control device address, in the same manner, to the applicable operating field control device. In this way the collection store distributes the various commands over the applicable operating field control devices to the individual apparatuses determined through the corresponding addresses. The command stored in the command store BS is transmitted to the operating field control device over the common circuits U11 to the relays E of the individual apparatuses ST1, after connection of the applicable individual apparatuses.

In modification of the example described herein, it is also possible to provide two different list stores in the collection store of FIG. 3, of which one serves to transmit items of information from the operating field control devices to the central control device, and the other serves to transmit commands from the central control device to the operating field control devices. Thus, the central control device can deposit commands in the collection store, although its list store serving to transmit information from the operating field control device to the central control device is full. By this means, the danger of a blockage of the central control device resulting from a supersaturation of information is prevented.

The preferred embodiment described hereinabove is intended only to be exemplary of the principles of the invention and is not to be considered as limiting its scope. The scope of the invention is defined by the appended claims, within which numerous modifications to or changes in the described embodiment will fall.

We claim:

1. Apparatus for centrally controlled telecommunication exchange installations wherein groups are formed from a plurality of individual apparatuses, each said group being connected to the central control over an individual buffer memory, comprising:

common circuit means connecting the individual apparatuses of a group to the said individual buffer memory associated with the group, said common circuit means including connection means for connecting each said individual apparatus separately to said common circuit means and thereby to said buffer memory, said individual apparatuses constituting a group being arranged with respect to the said buffer memory associated therewith as to be in sufficiently close spatial proximity thereto to facilitate direct communication therewith in a manner as to substantially avoid customary transmission line disturbances associated with line length and individual and separate transmission line means connecting each said buffer memory to said central control for direct data communication therebetween, whereby each said individual transmission line means can be matched for optimal transmission characteristics.

2. The apparatus defined in claim 1 further comprising:

collection memory means in said central control, said individual transmission lines connecting said buffer memories to said collection memory.

* * * * *